Patented Mar. 18, 1952

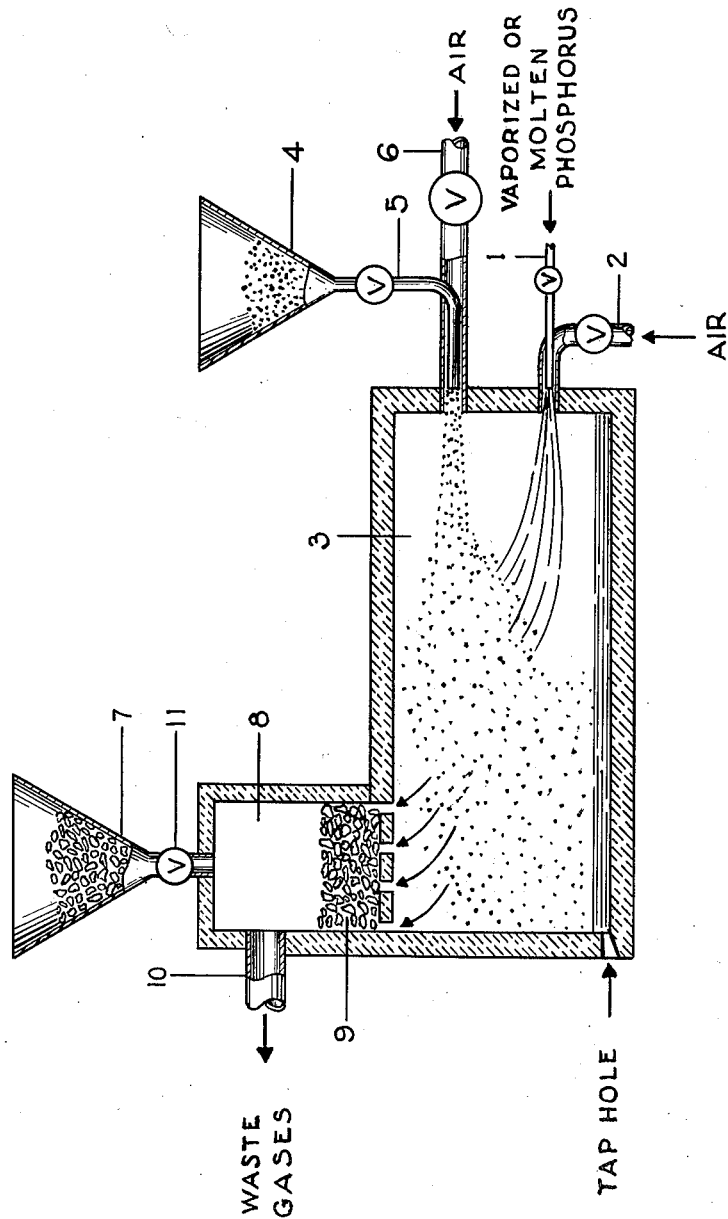

2,589,272

UNITED STATES PATENT OFFICE 2,589,272

PRODUCTION OF CALCIUM METAPHOSPHATE

Philip Miller, New York, N. Y., assignor to Tennessee Valley Authority, a corporation of the United States Application March 16, 1949, Serial No. 81,808

6 Claims. (Cl. 23—108)

(Granted under the act of March 3, 1883, as amended April 30, 1928; 370 O. G. 757)

The invention herein described may be manufactured and used by or for the Government for governmental purposes without payment to me of any royalty thereon.

This invention relates to improved methods for the production of calcium metaphosphate of fertilizer grade.

It has long been known that calcium metaphosphate is an excellent fertilizer material. Such fertilizers have been produced by reacting phosphate rock with phosphorus pentoxide at glowing heat. U. S. Patents No. 1,925,645 and No. 2,173,825 show methods and apparatus for the production of such fertilizer material.

In attempts to develop commercially practical methods for producing calcium metaphosphate fertilizers, a number of problems have arisen. One of the most important and most troublesome problems in the production of such materials is control of the mole ratio between phosphorus pentoxide and calcium oxide in the product. It is extremely desirable to maintain this ratio between 0.95:1 and 1:1. At lower values the phosphate content of the product becomes less and less available as plant food as the material approaches the composition of calcium pyrophosphate, in which the mole ratio of phosphorus pentoxide to calcium oxide is 1:2. At ratios higher than 1:1, the phosphate in this product is available, but the product itself is hygroscopic. The hygroscopicity increases as the phosphorus pentoxide content increases.

The phosphorus pentoxide-calcium oxide mole ratio in a product of the reaction of phosphate rock with phosphorus pentoxide is a complex function of the temperature of reaction, the charge composition, and other factors. Generally, an increase in the temperature in the reaction zone will cause a decrease in the phosphorus pentoxide-calcium oxide ratio.

The mole ratio can be controlled to some extent by controlling the temperature in the reaction zone. This method is not precise enough, however, to give a satisfactory product with all types of charges. As pointed out above, the ratio should be kept within the narrow limits of the range from 0.95:1 to 1:1 in order that the product may have the characteristics desired in a fertilizer; i. e., high availability of phosphate content and low hygroscopicity. The ratio is affected too much by the composition of the charge and by many other factors to allow such close control by temperature alone. The silicia content of the charge is an especially important factor. In general, operation becomes more difficult as the silica content of the charge increases. It has been considered impossible to use phosphate rock containing more than about 18 per cent silica in this reaction.

In most prior processes for the production of calcium metaphosphate fertilizer by direct reaction of phosphorus pentoxide with phosphate rock, lump charges have been used. This was believed to be necessary in order to avoid high back pressure in the phosphorus combustion zone and to prevent fine materials from blowing out of the furnace. However, most of the phosphate ore mined at present is obtained in fine form and must be agglomerated if it is to be used in lump form. Agglomeration of fine material adds considerably to the expense of such processes.

Extensive tests with lump charges, in which the temperature was controlled as closely as possible, have given products in which the phosphorus pentoxide-calcium oxide ratio varied from 0.89:1 to 1.88:1. At the lower ratios the availability of the phosphate content of the material was as low as 81 per cent. At the higher ratios, the availability was from 98 to 100 per cent, but the product was too hygroscopic for fertilizer use. Good products could be obtained only by the use of charges of certain particular types in combination with close temperature control. Such methods have the disadvantages that many types of phosphate ore cannot be used and that the precise control by temperature alone is difficult to attain. Recovery of phosphorus pentoxide from the phosphorus combustion gases is usually very high in processes involving the reaction of such gases with lump phosphate rock. A relatively deep bed of lump charge must be maintained, however, and channeling is sometimes encountered. In contrast, low phosphorus pentoxide recovery has been a major problem in most of the prior processes in which phosphate rock of less than $\frac{1}{4}$ inch average diameter has been used.

It is an object of this invention to provide a process for the production of calcium metaphosphate of fertilizer grade in which the ratio of phosphorus pentoxide to calcium oxide in the product may be easily maintained in the range from 0.95:1 to 1:1.

Another object is to provide a process of this type in which a high proportion of fine phosphate rock may be utilized without the expense of agglomeration.

Another object is to provide a process of this type in which phosphate rock having high silica content may be used efficiently.

Still another object is to provide a process of this type in which high recovery of raw materials may be obtained.

Other objects and advantages will become apparent from consideration of the following description, claims, and drawing.

I have now found that these objects may be attained by use of the following process, in which the major part of the phosphate rock consumed is fed in the form of fines and the remainder is in agglomerates or lumps of substantial size.

A continuous stream of phosphorus in liquid or vapor phase is introduced into a primary reaction zone in conjunction with at least one stream of air. This phosphorus becomes ignited and burns to form phosphorus pentoxide. The rate of introduction of phosphorus and air is controlled to maintain a temperature substantially above the melting point of calcium metaphosphate, both in this primary reaction zone and in a secondary reaction zone mentioned below. From about 70 per cent to about 90 per cent of the quantity of phosphate rock required to react with the quantity of phosphorous pentoxide produced is introduced into the hot primary reaction zone in the form of fines. This finely divided material is introduced in a suitable manner to effect intimate and prolonged contact between the individual particles and the phosphorus pentoxide vapor.

In general it will be found advantageous to inject the fines at an elevation, direction, and velocity such that they will travel as far as possible before impinging on the walls or falling to the bottom of the reaction zone. The phosphorus pentoxide-calcium oxide ratio in the product is controlled by varying the proportion of charge fed as fines in the range from 70 to 90 per cent and, if necessary, by varying the temperature in the range from 1000° C. to 1315° C. Most of the reacted fines are collected in the combustion zone by settling or impingement on the walls. Any entrained particles are stopped by the lump charge and drain back with the calcium metaphosphate formed by reaction with the lump rock.

In brief, my process comprises continuously introducing a stream of phosphorus into a combustion zone in intimate contact with a continuous stream of air; concomitantly introducing a continuous stream of finely divided phosphate rock into the combustion zone; intimately contacting the finely divided phosphate rock, in suspension in the combustion zone with gaseous products of combustion resulting from burning the stream of phosphorus; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain temperatures in the combustion zone and in the secondary reaction zone substantially above the melting point of calcium metaphosphate; concomitantly controlling the rate of introduction of finely divided phosphate rock to maintain the rate of introduction thereof in the range from 70 to 90 per cent of that theoretically required to react with all phosphorus pentoxide formed by combustion of the stream of molten phosphorus to form calcium metaphosphate; and withdrawing molten calcium metaphosphate from the system.

In the attached drawing, the single figure is a vertical section of one type of apparatus in which my novel process may be carried out. With reference thereto, molten phosphorus or phosphorus vapor from any suitable source (not shown) is continuously introduced at controlled rate via line 1, while compressed air from any suitable source is concomitantly introduced via line 2. The resulting spray of phosphorus droplets or vapor in a stream of air is blown into combustion zone 3 and the phosphorus takes fire and burns therein to form phosphorus pentoxide. Fine phosphate rock from any suitable source 4, is continuously introduced at controlled rate via valved line 5 into zone 3, preferably at sufficient velocity to cause the larger particles to be carried substantially to the end of zone 3 opposite to the entrance of line 5 before falling to the bottom. The relative rates at which phosphorus and fine phosphate rock are introduced are so controlled that the quantity of fine rock is in the range from 70 to 90 per cent of the amount theoretically required to react to form calcium metaphosphate with all the phosphorus pentoxide produced.

The introduction of phosphate rock at relatively high velocity is preferably accomplished by introducing this rock suspended in a stream of secondary air, led in via line 6. Other means of introducing the rock may be used, such as mechanical injection, but these are less convenient in operation.

By operating in this manner, by far the greater quantity of phosphate rock is converted to calcium metaphosphate while it is suspended in contact with hot vapors of phosphorus pentoxide or flowing over the surface of the combustion zone. The product impinging on the walls flows to the bottom of zone 3 or settles to the bottom of said zone. Zone 3 communicates with zone 8, which is partially filled with agglomerated or lump phosphate 9. An effluent, comprising products of combustion and entrained particles, is passed from zone 3 into zone 8 and through the interstices of lump or agglomerated phosphate rock 9. The residual phosphorus pentoxide in the effluent stream reacts with phosphate rock and substantially all suspended particles adhere to the phosphate rock in zone 8.

The introduction of phosphorus via line 1 is maintained at sufficiently high rate to keep the temperatures in zones 3 and 8 above the melting point of calcium metaphosphate and within the range from 1000° C. to 1315° C. When it is burned at a rate above that required to maintain temperatures in the range from 1000° C. to 1315° C., cooling is preferably employed to keep the temperatures within this range. Impure calcium metaphosphate produced under these conditions has a melting point near 1000° C.

Phosphate rock 9 is replenished at intervals by operating valve 11 permitting the phosphate rock to enter from storage 7. Waste gases are discharged to the atmosphere via line 10. Molten product trickles down into the bottom of combustion zone 3 and is tapped out in conventional manner.

I have found that the fine reacted particles have two unexpected properties which make my process operable. The first of these is the unusual degree of stickiness of these particles, which causes them to adhere to the first surface touched and prevents their being carried beyond zone 3 by the effluent. The reacted particles melt at the temperature of the operation, which is controlled by varying the amount of phosphorus burned in zone 3, by varying the amount of secondary air admitted, and/or by cooling the walls of zone 3, or in any other manner desired. These particles fuse together to form films. I have also found that films flowing down the walls of zone 3 do not absorb sufficient phosphorus pentoxide from the vapor in contact therewith to increase the ratio beyond the desired range under the conditions described. This is also true of molten calcium metaphosphate which is formed on the lump phosphate rock by reaction with phosphorus pentoxide and flows down into the bottom of zone 3.

It is desirable to correlate particle size, reaction temperature, and combustion zone dimensions in order to get best operation of the process. The temperature used is preferably that which gives best results for the reaction in the lump charge, and will depend on the composition of the lump materials. The particle size of the fines which will give best results will depend on the temperature, that size being used which will react completely with phosphorus pentoxide at the temperature used in the combustion zone in the period of time elapsing while fines are traversing the zone. The combustion zone must be of such length and height to allow a sufficient length of travel for the fines. It is also desirable that the combustion zone dimensions be such that the velocity of the air used to blow the fines into the zone is abruptly decreased soon after introduction, so that the further path of the fines depends mainly on their own momentum and turbulence in the zone. By this means the larger particles travel a longer path than the finer ones before they impinge on the walls or settle to the bottom of the combustion zone, thus giving them the necessary time to react. This helps to avoid incompletely reacted larger particles and a high phosphorous pentoxide-calcium oxide ratio in the smaller ones.

I have found that by the use of this method the phosphorus pentoxide-calcium oxide mole ratio can be effectively and easily limited to the desired range while employing a broad range of reaction temperatures merely by varying the ratio between the fines and lump or agglomerated phosphate rock used in the reaction. Particle size of the fines is highly important in this process. In general, the size should be such that the particles will remain suspended in the gas stream for several seconds. If they are too large, they will get insufficient contact with phosphorus pentoxide to give complete conversion of the raw phosphate to calcium metaphosphate.

As an example of the size of fine material which may be used, tests have shown that at 1100° C., 200-mesh particle size with 80 per cent of the charge fed as fines, about 10 seconds suspension time of particles in the gaseous products of combustion would be required to give 97 per cent conversion of the particles to calcium metaphosphate. At 100-mesh, about 20 seconds would be required. Because of the shorter suspension time, I prefer to use fines of about 200-mesh or smaller size.

The particle size which is usable depends somewhat on the length of time the fines can be kept suspended in the combustion gases, which in turn depends on the length of trajectory available in the combustion zone.

Apparently the particles react with phosphorus pentoxide both while suspended in the gaseous reactant and while in partially reacted molten state flowing down the walls of the reaction zone. For this reason it does not seem necessary that the fines be suspended in the gaseous products of combustion for the full length of time required for them to react completely to form metaphosphate. A few seconds is apparently sufficient for initial reaction, which is completed as the particles flow down the combustion zone walls. This reaction, however, apparently does not result in the absorption of more phosphorus pentoxide than is required to form calcium metaphosphate. Samples of the entrained particles taken at the combustion zone exit were found to have the same phosphorus pentoxide content as that of the tapped product.

The relatively large diameter of the combustion zone may also be a contributing factor to the success of this process. Tests of the distribution of fines in the zone showed that the dust settling near the exit contained a higher proportion of large particles than did that settling at the inlet end. This indicates that the relatively large size of the zone resulted in rapid decrease in velocity of the air used to blow the fine material in, so that the trajectory of the fines depended mainly on their own momentum. This would give the larger particles a longer path and, consequently, a desirably longer time to contact phosphorus pentoxide. The shorter path of the finer particles is also desirable in order to prevent excessive reaction with phosphorus pentoxide. In practice, turbulence in the gas stream may nullify this difference in trajectory to some extent, by keeping fine particles suspended. However, since the reacted particles apparently stick firmly to the wall the first time they strike it, there apparently is little undesirable suspension by such fluidization.

The advantages of this process over those previously used are obvious. In addition to the efficient and easy control of product ratio, the charge composition is much less critical than in processes using an all-lump charge. High silica charges are handled more easily and give good results when the silica content is as high as 25–26 per cent. High phosphorus pentoxide recovery can be obtained with less precise control, and the reaction temperature is less critical than in other methods. A broad range of temperatures within the range from 1000° C. to 1315° C. can be used. This gives much flexibility to the process.

*Example*

An extensive series of tests was made using an apparatus having the general features described above, operated according to the present process, to determine the accuracy with which the phosphorus pentoxide-calcium oxide mole ratio in the product can be controlled merely by varying the proportion of total phosphate rock fed as fines.

In the following table a few representative results are shown. These were obtained by varying the fines-lump ratio over a narrow range while the temperature was held substantially constant. Fines of such size that about 75 per cent passed through a standard 200-mesh screen were used. The temperature was approximately 1150° C.

| Length of $P_4$ feed rate, test, hr. | lb./hr | Amount of fines, per cent of stoichiometric | Product mole ratio, $P_2O_5$–CaO |
|---|---|---|---|
| 17 | 247 | 76 | 1.05 |
| 19 | 272 | 82 | .95 |
| 25 | 253 | 83 | .96 |
| 20 | 165 | 85 | .97 |

These tests illustrate the close control of phosphorus pentoxide-calcium oxide mole ratio in the product that can be obtained merely by varying the fines-lump ratio.

It will be noted that the uppermost line in the above table indicates that a mole ratio outside the desired range was obtained under the particular conditions of that particular test. However, it was found that the known general rule that an increase in the temperature of reaction lowers the phosphorus pentoxide-calcium oxide mole ratio in the product and vice versa applies to this process as well as to other processes for producing calcium metaphosphate.

Other tests were made using the same type of feeds at somewhat higher temperatures and it was found that the fines fed might be decreased to 70 per cent of stoichiometric with temperatures ranging up to about 1315° C. without increasing the mole ratio above the desired range. Operable temperatures in the range from about 1000° C. to about 1315° C. may be selected by applying the above conventional rule.

A large number of different raw materials representative of substantially all types of Tennessee and Florida phosphate rocks were included in this series of tests. It was found that fines containing up to about 25 per cent to 26 per cent silica were easily operable in this process.

Fines were also fed in proportions above 90 per cent and below 70 per cent of stoichiometric. Products having the desired mole ratios could not be obtained.

All types of phosphate rock tested were found to give calcium metaphosphate products having phosphorus pentoxide-calcium oxide mole ratios in the range from 0.95:1 to 1:1 when fines were fed in a broad range of rates within the range from 70 per cent to 90 per cent of stoichiometric proportions and reaction temperatures were maintained in a broad range within the range from the melting point of the calcium metaphosphate product to about 1315° C.

Having described my invention and explained its operation, I claim:

1. A process for the production of calcium metaphosphate which comprises continuously introducing a stream of fluid phosphorus into a combustion zone in intimate contact with a continuous stream of air; concomitantly introducing a continuous stream of finely divided phosphate rock into the combustion zone; intimately contacting the finely divided phosphate rock, in suspension in the combustion zone, with gaseous products of combustion resulting from burning the stream of phosphorus; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain a temperature in the combustion zone and in the secondary reaction zone substantially above the melting point of calcium metaphosphate; passing the resulting molten calcium metaphosphate from the secondary reaction zone into the combustion zone; concomitantly controlling the rate of introduction of finely divided phosphate rock to maintain the rate of introduction thereof in the range from 70 per cent to 90 per cent of that theoretically required to react with all phosphorus pentoxide formed by combustion of the stream of molten phosphorus to form calcium metaphosphate; controlling the rate of introduction of finely divided phosphate rock within said range to maintain the phosphorus pentoxide-calcium oxide ratio in the resulting calcium metaphosphate product in the combustion zone in the range from 0.95:1 to 1:1; and withdrawing molten calcium metaphosphate from the combustion zone.

2. A process for the production of calcium metaphosphate which comprises continuously introducing a stream of fluid phosphorus into a combustion zone in intimate contact with a continuous stream of air; concomitantly introducing a continuous stream of finely divided phosphate rock into the combustion zone; intimately contacting the finely divided phosphate rock, in suspension in the combustion zone, with gaseous products of combustion resulting from burning the stream of phosphorus; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain a temperature in the combustion zone and in the secondary reaction zone substantially above the melting point of calcium metaphosphate; passing the resulting molten calcium metaphosphate from the secondary reaction zone into the combustion zone; concomitantly controlling the rate of introduction of finely divided phosphate rock to maintain the rate of introduction thereof in the range from 70 per cent to 90 per cent of that theoretically required to react with all phosphorus pentoxide formed by combustion of the stream of molten phosphorus to form calcium metaphosphate; controlling the rate of introduction of finely divided phosphate rock within said range and controlling the temperature within said combustion zone and within said secondary reaction zone in the range from 1000° C. to 1315° C. to maintain the phosphorus pentoxide-calcium oxide ratio in the resulting calcium metaphosphate product in the range from 0.95:1 to 1:1; and withdrawing molten calcium metaphosphate from the combustion zone.

3. A process for the production of calcium metaphosphate which comprises continuously spraying a stream of molten phosphorus into a combustion zone in intimate contact with a continuous stream of air; concomitantly introducing a continuous stream of finely divided phosphate rock suspended in a second continuous stream of air into the combustion zone at high velocity; abruptly decreasing the velocity of the second stream of air in the combustion zone and passing the suspended finely divided phosphate rock further into the combustion zone by its own momentum; intimately contacting the finely divided phosphate rock in suspension in the combustion zone with gaseous products of combustion resulting from burning the stream of phosphorus; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain temperatures in the combustion zone and in the secondary reaction zone substantially above the melting point of calcium metaphosphate; passing the resulting molten calcium metaphosphate from the secondary reaction zone into the combustion zone; concomitantly controlling the rate of introduction of finely divided phosphate rock to maintain the rate of introduction thereof in the range from 70 per cent to 90 per cent of that theoretically required to react with all phosphorus pentoxide formed by combustion of the stream of molten phosphorus to form calcium metaphosphate; and withdrawing molten calcium metaphosphate from the combustion zone.

4. A process for the production of calcium metaphosphate which comprises continuously spraying a stream of molten phosphorus into a combustion zone in intimate contact with a continuous stream of air; concomitantly introducing a continuous stream of finely divided phosphate rock suspended in a second continuous stream of air into the combustion zone at high velocity; abruptly decreasing the velocity of the second stream of air in the combustion zone and passing the suspended finely divided phosphate rock further into the combustion zone by its own momentum; intimately contacting the finely divided phosphate rock in suspension in the combustion zone for a few seconds with gaseous products of combustion resulting from burning the stream of phosphorus; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain temperatures in the combustion zone and in the secondary reaction zone substantially above the melting point of calcium metaphosphate; passing the resulting molten calcium metaphosphate from the secondary reaction zone into the combustion zone; concomitantly controlling the rate of introduction of finely divided phosphate rock to maintain the rate of introduction thereof in the range from 70 per cent to 90 per cent of that theoretically required to react with all phosphorus pentoxide formed by combustion of the stream of molten phosphorus to form calcium metaphosphate; controlling the rate of introduction of finely divided phosphate rock within said range to maintain the phosphorus pentoxide-calcium oxide ratio in the resulting calcium metaphosphate product in the range from 0.95:1 to 1:1; and withdrawing molten calcium metaphosphate from the combustion zone.

5. A process for the production of calcium metaphosphate which comprises continuously spraying a stream of molten phosphorus into a combustion zone in intimate contact with a continuous stream of air; concomitantly introducing a continuous stream of finely divided phosphate rock suspended in a second continuous stream of air into the combustion zone at high velocity; abruptly decreasing the velocity of the second stream of air in the combustion zone and passing the suspended finely divided phosphate rock further into the combustion zone by its own momentum; intimately contacting the finely divided phosphate rock in suspension in the combustion zone with gaseous products of combustion resulting from burning the stream of phosphorus; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain temperatures in the combustion zone and in the secondary reaction zone substantially above the melting point of calcium metaphosphate; passing the resulting molten calcium metaphosphate from the secondary reaction zone into the combustion zone; concomitantly controlling the rate of introduction of finely divided phosphate rock to maintain the rate of introduction thereof in the range from 70 per cent to 90 per cent of that theoretically required to react with all phosphorus pentoxide formed by combustion of the stream of molten phosphorus to form calcium metaphosphate; controlling the rate of introduction of finely divided phosphate rock within said range and controlling the temperature within said combustion zone and within said secondary reaction zone in the range from 1000° C. to 1315° C. to maintain the phosphorus pentoxide-calcium oxide ratio in the resulting metaphosphate product in the range from 0.95:1 to 1:1; and withdrawing molten calcium metaphosphate from the combustion zone.

6. A process for the production of calcium metaphosphate which comprises continuously spraying a stream of molten phosphorus into a combustion zone in intimate contact with a continuous stream of air; concomitantly introducing a continuous stream of finely divided phosphate rock suspended in a second continuous stream of air into the combustion zone at high velocity; abruptly decreasing the velocity of the second stream of air in the combustion zone and passing the suspended finely divided phosphate rock further into the combustion zone by its own momentum; intimately contacting the finely divided phosphate rock in suspension in the combustion zone for a few seconds with gaseous products of combustion resulting from burning the stream of phosphorus; contacting coarser particles of finely divided phosphate rock with said products of combustion for a longer time than finer particles thereof; withdrawing a gaseous effluent from the combustion zone; passing the withdrawn gaseous effluent through a bed of phosphate rock in lumps of substantial size in a secondary reaction zone; controlling the rate of introduction of the stream of molten phosphorus to maintain temperatures in the combustion zone and in the secondary reaction zone substantially above the melting point of calcium metaphosphate; passing the resulting molten calcium metaphosphate from the secondary reaction zone into the combustion zone; concomitantly controlling the rate of introduction of finely divided phosphate rock to maintain the rate of introduction thereof in the range from 70 per cent to 90 per cent of that theoretically required to react with all phosphorus pentoxide formed by combustion of the stream of molten phosphorus to form calcium metaphosphate; controlling the rate of introduction of finely divided phosphate rock within said range to maintain the phosphorus pentoxide-calcium oxide ratio in the resulting calcium metaphosphate product in the range from 0.95:1 to 1:1; and withdrawing molten calcium metaphosphate from the combustion zone.

PHILIP MILLER.

REFERENCES CITED

The following references are of record in the file of this patent:

UNITED STATES PATENTS

| Number | Name | Date |
| --- | --- | --- |
| 1,925,645 | Pristoupil | Sept. 5, 1933 |
| 2,142,943 | Kerschbaum | Jan. 3, 1939 |
| 2,173,825 | Curtis et al. | Sept. 26, 1939 |
| 2,184,287 | Curtis | Dec. 26, 1939 |
| 2,266,328 | McCullough | Dec. 16, 1941 |